United States Patent [19]

Gerhardt et al.

[11] 4,410,233
[45] Oct. 18, 1983

[54] UNEQUAL FOUR-BAR LINKAGE SCAN MIRROR ASSEMBLY

[75] Inventors: Leslie H. Gerhardt, Acton; Richard P. Mitrano, Tewksbury, both of Mass.

[73] Assignee: Honeywell Inc., Minneapolis, Minn.

[21] Appl. No.: 260,670

[22] Filed: May 7, 1981

[51] Int. Cl.³ .................. G02B 7/18; G02B 27/14
[52] U.S. Cl. ........................ 350/6.6; 248/486
[58] Field of Search ............ 350/6.6, 6.5, 6.9, 6.91, 350/6.1, 484, 289, 304; 250/347, 235; 248/486, 485

[56] References Cited

U.S. PATENT DOCUMENTS 3,742,238  6/1973  Hoffman .................. 350/6.91
3,771,854  11/1973  Roark ....................... 350/304

*Primary Examiner*—Jon W. Henry
*Attorney, Agent, or Firm*—John S. Solakian; Laurence J. Marhoefer

[57] ABSTRACT

Opto-mechanical scanning of a scene of interest is provided by use of an unequal four-bar linkage assembly which simultaneously rotates and translates a scan mirror, thereby minimizing the size of the optical window, the size of the scan mirror, and the working space required by the scan mirror.

16 Claims, 6 Drawing Figures

UNEQUAL FOUR-BAR LINKAGE SCAN MIRROR ASSEMBLY

BACKGROUND OF THE INVENTION

The Government has rights in this invention pursuant to Contract No. DAAK11-79-C-0051 awarded by the Department of the Army.

The present invention relates to an apparatus for the opto-mechanical scanning of a scene of interest in one dimension, for example, as used in an infrared spectroradiometer which collects and samples background radiation through a specified angular field of view.

In past devices this spatial scanning has been accomplished by a variety of means, for example, through the rotation of a planar deflecting mirror about a line, termed a "fixed pivot point". Collimated energy enters the system through a beam-limiting entrance window or port and is redirected by the movable scan mirror along a path parallel to the optical axis of the system. While this single pivot point mechanism has several advantages, one for example being its limited number of moving parts, it is not well-suited for a wide field of view system since the dimension, weight, and included volume of the scan motion must be large in order to accommodate the entire angular extent of the scan. In such configuration a trade-off is made between window and mirror size, and range of motion. In infrared systems it is advantageous to reduce the size of the optical window which is generally made from a costly material, such as silicon, germanium or zinc selenide, at the expense of an increase in size of the scanning mechanism. In addition, it is important to provide a scan apparatus having reduced susceptibility to vibration and misalignment.

It is accordingly a primary object of the present invention to provide an improved scan apparatus which provides a relatively wide angular field of view with a relatively small optical window.

SUMMARY OF THE INVENTION

The above and other objects are achieved according to the present invention by providing apparatus for spatial scanning of the object space to be examined. This is accomplished by motion of a substantially flat mirror mounted via a four-bar linkage mechanism. Size and location of the entrance window or pupil relative to the position and motion of the scan mechanism define the angular field of view of the optical system. Electromagnetic radiation entering the system through the optical window or port (i.e., an aperture without an optical window) is relayed by this scan mirror, regardless of its instantaneous position, to the collection optics and detector electronics. In the scan mechanism, the mirror frame constitutes one link of the mechanism and houses two moving pivots which are attached to the second and third links, one of which is motor driven creating motion of the mirror, and another which is passive and follows the mirror's motion. The opposite ends of these links are fixed, being attached to the sensor housing or some suitable frame. The distance between these two fixed pivots constitutes the fourth link of the four-bar linkage mechanism. The relative link lengths and positions dictate the mirror position as it is rotated and translated. Rotary motion of the drive link, and therefore the scan mirror, may be accomplished by a worm drive gear set, whose output is the input of the drive link at the fixed pivot on the scanner housing. Motion to the gear set may be provided through a stepping motor coupled to the input shaft of the gear set by a flexible coupling.

BRIEF DESCRIPTION OF THE DRAWINGS

The above and other objects of the present invention are achieved in the illustrative embodiment as described with respect to the Figures in which.

DETAILED DESCRIPTION OF THE PREFERRED EMBODIMENT

Figure 1:
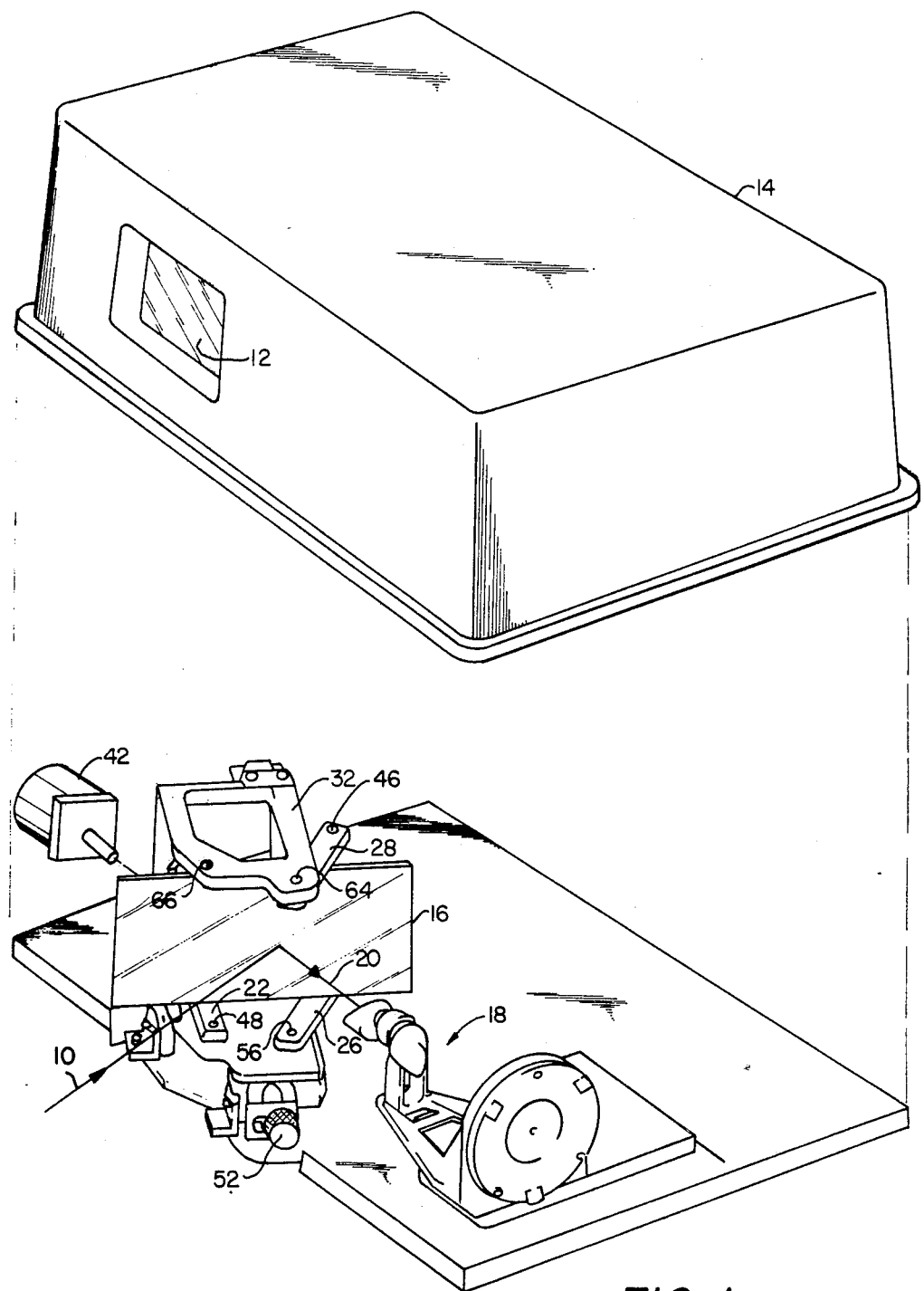
FIG. 1 is a perspective drawing of the scan mechanism of the present invention.
Figure 2:
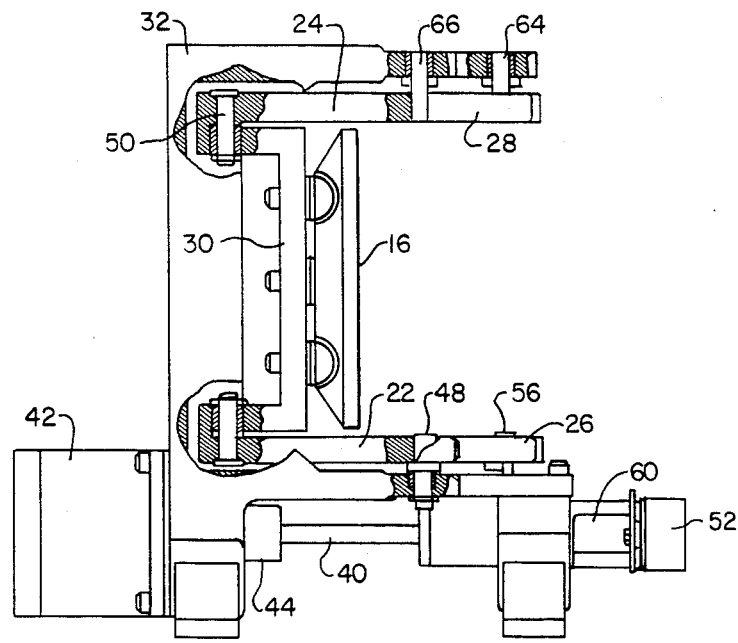
FIG. 2 is a side view of the scan mechanism of the present invention.
Figure 3:
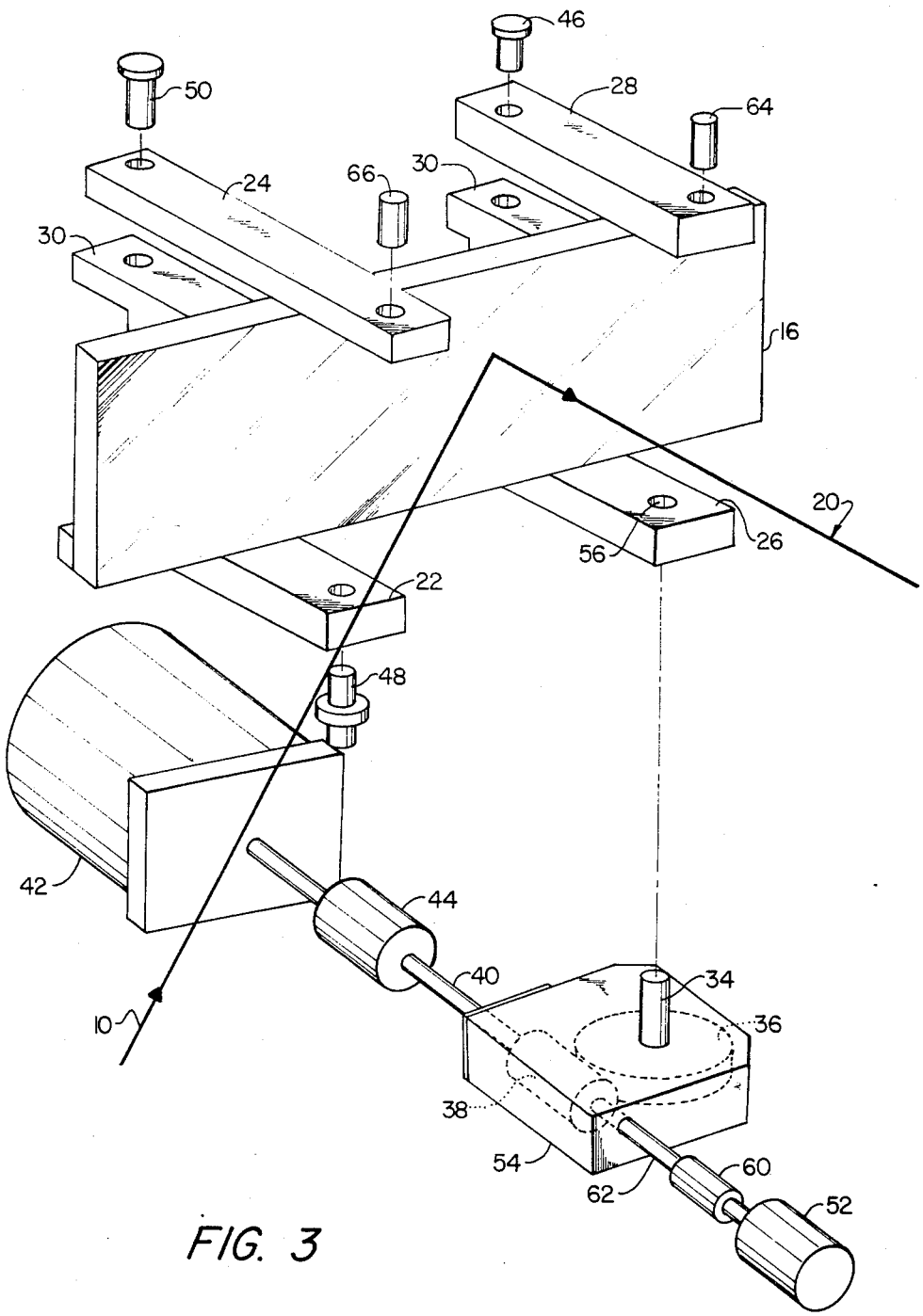
FIG. 3 is an exploded view of the scan mechanism of the present invention.

Referring to FIGS. 1, 2 and 3, the unequal four-bar linkage of a scan mirror is shown. The optical coupling to collection or focusing optics is also shown. The case for such assembly, which case includes an optical window, is also shown just above the main optical assembly. The assembly also shows additional space used for other components which may be included in the system of the optical scanning apparatus of the present invention.

More particularly, FIGS. 1, 2 and 3 illustrate the direction of collimated radiant energy traveling along optical path 10, which path, in the fully assembled system, is through window 12 of cover 14. This energy is received by mirror 16 and is reflected along optical axis 20 into the collection optics 18 of the system. Scanning is accomplished by utilizing a four-bar linkage mechanism which includes drive links 26 and 28, follower links 22 and 24, mirror mount 30, and the coupling which spans the connecting fixed pivot points of links 22 and 26 (or corresponding links 24 and 28) on mirror frame or housing 32. Spatial scanning through mirror motion is achieved by rotation of drive link 26 via gear box 54. This link is coupled to the output shaft 34 of worm wheel 36 which is driven by a corresponding worm gear 38 on input shaft 40. Motor 42 drives shaft 40 through a flexible coupling 44. Motor 42 in one embodiment may be a stepping motor.

The actual four-bar linkage is in fact essentially duplicated in order to provide physical support to the mirror 16 due to the height thereof. More particularly, the basic four-bar linkage includes the drive link 26 which is coupled via gear box 54 to motor 42 as discussed above. The second link is the follower link 22. The other two links include the mirror mount 30 and the housing 32. Thus, for support purposes, links 26 and 22 are duplicated by links 28 and 24, respectively. The other two links, housing 32 and mount 30, are common to both the basic links 26 and 22 and the so-called support links 28 and 24.

Drive link 26 rotates about output shaft 34. Pivot shaft 46 connects drive link 26 to mirror mount 30 allowing for relative rotary motion between these two components. One end of follower link 22 is restricted to pivot about shaft 48 mounted by use of a bearing in housing 32. The opposite end of follower link 22 is connected to the end of mirror mount 30 through a pivot shaft similar to pivot shaft 50, which also allows for relative rotary motion between these two components, i.e., follower link 22 and mirror mount 30. Mirror 16 may be considered to be an extension of mirror mount 30.

Figure 4A:
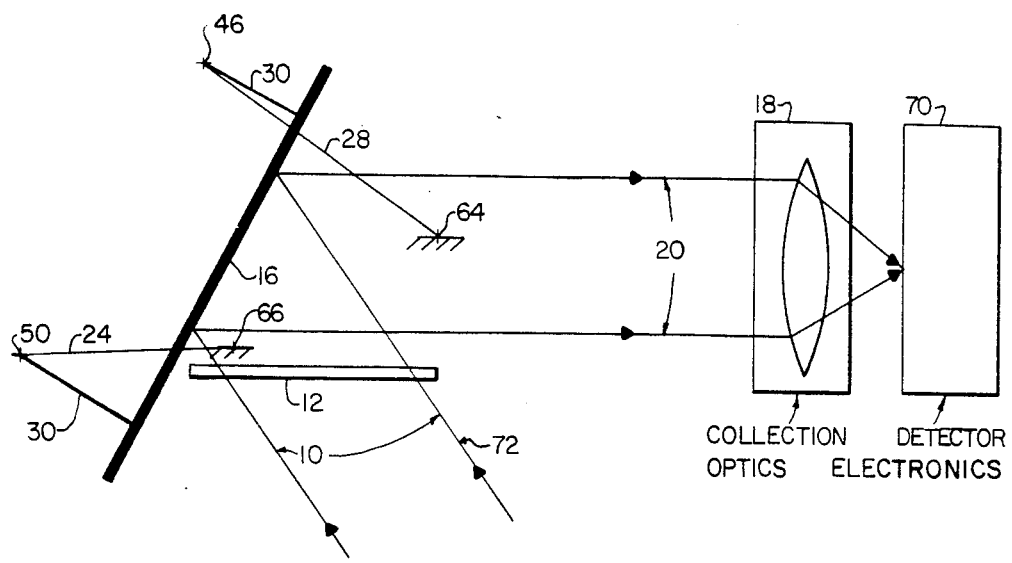
FIGS. 4A and 4B illustrate respectfully extreme positions of the scan mirror of the apparatus of the present invention.
Figure 4B:
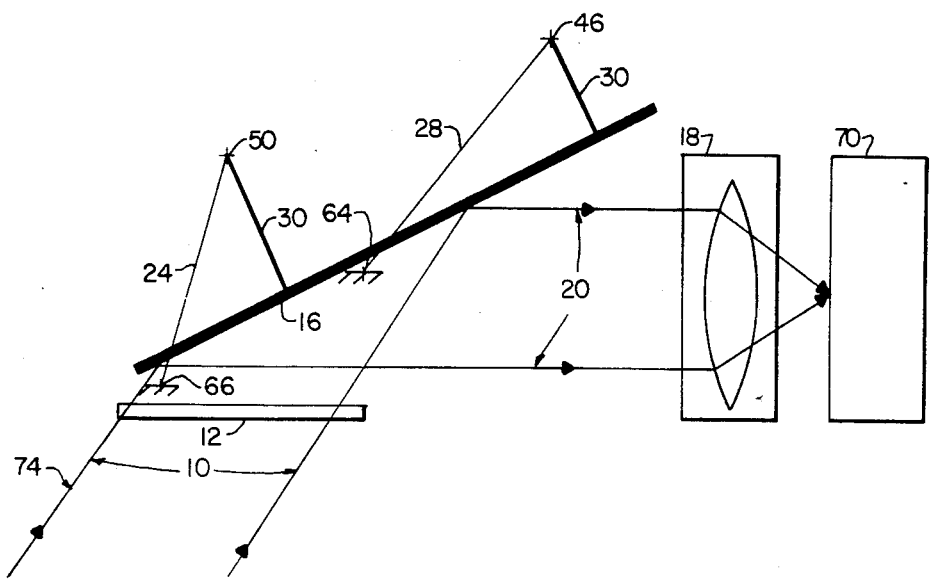

The position of mirror 16 together with the pivot points or shafts and lengths and relative positions of the links, minimize the (i) mirror size, (ii) volume required by the scan operation, and (iii) the size of the entrance pupil or optical window 12 defined by the extreme positions of mirror 16 as shown in FIGS. 4A and 4B. Mirror angle and location is a function of link lengths and positions also as shown in FIGS. 4A and 4B. As a result, the angle between the link constituting (or the plane of) the scan mirror 16 and the optical axis 20 to the collection optics can be expressed as a function of the angle between the drive link 26 and some arbitrary coordinate system. The mirror angle may be sensed by the variation in electrical resistance of a potentiometer 52 coupled to input shaft 40, which connects motor 42 through gear box 54 to link 26. A flexible coupling 60 may be used to connect shaft 62 to the potentiometer 52. Likewise, a flexible coupling 44 connects motor 42 to shaft 40. The analog output of potentiometer 52 is used to provide feedback signals to processing electronics which control the output rotation of motor 42.

Another embodiment, as an alternative to the potentiometer 52, may include any other rotary resolving device, such as, for example, an encoder substituted to sense mirror position. It should also be noted that any resolving device used, including the potentiometer 52, might be activated by link motion at other locations, for example, through extensions of shafts 64, 66 or 48 at links 28, 24 and 22, respectively.

Now referring to FIGS. 4A and 4B, a simplified top view of the mirror 16 is shown in two extreme positions which illustrate the total field of view through window 12 as encompassed between line 72 shown in FIG. 4A and line 74 shown in FIG. 4B. In each of such Figures, optical path 10 is shown passing through window 12 to mirror 16. The energy so received by mirror 16 is reflected via path 40 into collection or focusing optics 18 whose output is coupled for receipt by detector electronics 70 which may, by way of example, be an interferometer. Each of such Figures illustrate the relationship of the bars or links and the respective pivot points or shafts, however, for ease of illustration, only the bars and shafts which are located above the mirror 16 are shown. The other bars and shafts below the mirror 16 are positioned directly below those shown. For example, bar 26 is directly below bar 28. The two pivot points 64 and 66 are shown grounded or fixed, i.e., they cannot move in any direction, and are used only as a pivot point for their respective bars 28 and 24. The linkage between bars 24 and 28 to the mirror 16 is provided through mirror mount 30 shown simply as two separate arms from pivot points or shafts 50 and 46. With the mirror in the position shown in FIG. 4A, the field of view through window 12 encompasses all of optical path 10 with one extreme of the system's total field of view bound by line 72. As the mirror is simultaneously rotated and translated by use of the four-bar linkage of the present invention, path 10 shifts to the left until the mirror 16 is positioned in its other extreme position as shown in FIG. 4B. The other extreme of the system's total field of view is then bound by line 74. The mirror 16 is thus rotated and translated in an arc of nonconstant radius to produce the desired results.

Figure 5:
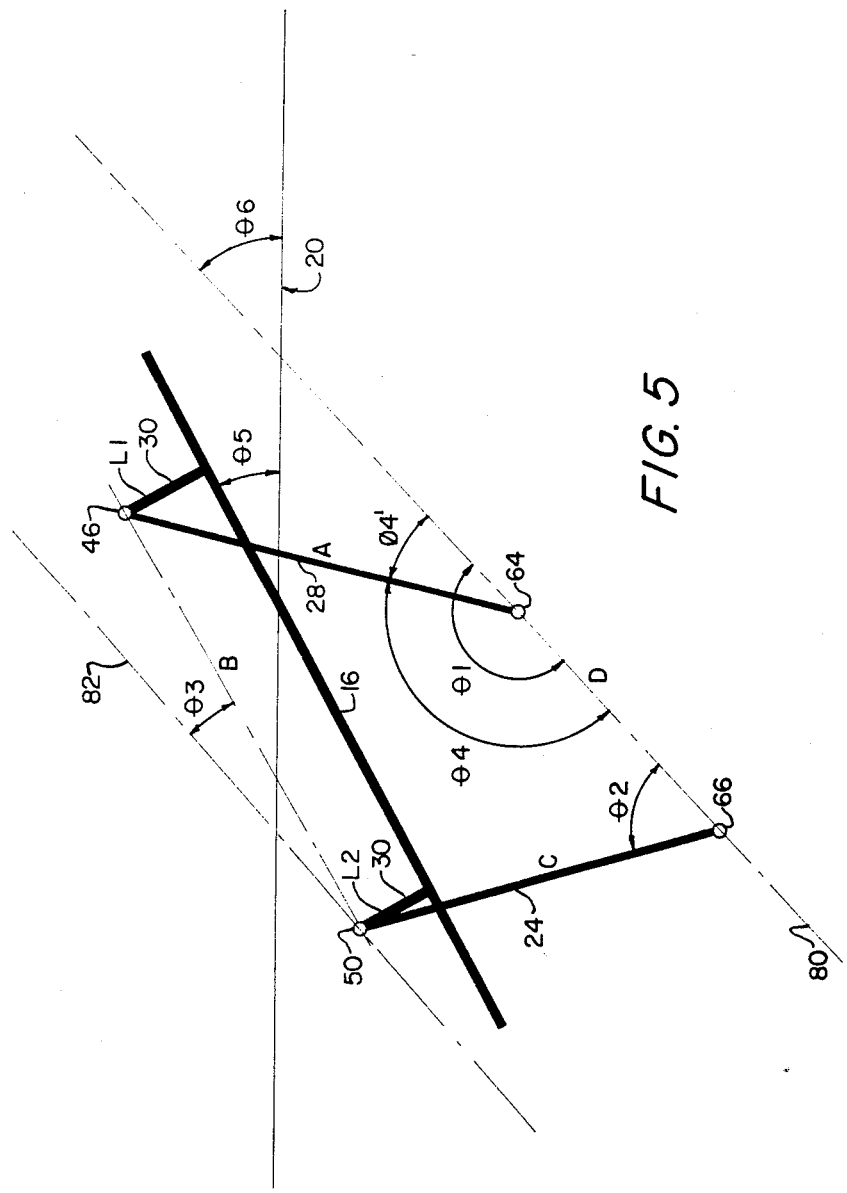
FIG. 5 illustrates the geometric relationships of the four-bar linkage and scan mirror of the present invention.

In FIG. 5, the geometric relationship of the various elements in the system are shown. The bar A between pivot points 64 and 46 is the drive link 28 (or its counterpart 26). The bar C between pivot points 66 and 50 is the follower link 24 (or its counterpart 22). The line B between points 50 and 46 is the mirror mount 30. The line D between points 66 and 64 represents the housing 32 to which pivot points 66 and 64, as well as their counterpart pivot points 48 and 56, are fixed as also illustrated in FIGS. 4A and 4B. Lines 80 and 82 are parallel lines. The lengths of linkages A, B, C and D, as well as the angles $\theta 1$ through $\theta 6$ are described by equations which are known as Freudenstein's equations. A discussion thereof may be found in the book entitled "Mechanism Synthesis and Analysis", by A. H. Soni, McGraw-Hill Book Company, 1974.

Such equations, as applied to the present invention, are set forth hereinafter. Use of such equations is made after the total excursion of the mirror 16 for the field of view desired and the size of the window 12 is specified. The lengths of the arms of mirror mount 30 are also specified. One such arm may be longer than the other arm, i.e., L1 may be longer than L2. In addition, point 66 as well as length C are established, following which length A is established. This then allows point 64 to be set. The other parameters are then also set in accordance with such equations as follows:

$$K1 = D/A; K2 = D/C; K4 = D/B;$$

$$K3 = \frac{A^2 - B^2 + C^2 + D^2}{2AC};$$

$$K5 = \frac{C^2 - D^2 - A^2 B^2}{2AB};$$

$$A = \cos\theta 4 + K3 - K1 - K2 \cos\theta 4;$$

$$B = -2 \sin\theta 4;$$

$$C = K1 + K3 - (1 + K2) \cos\theta 4;$$

$$D = K4 \cos\theta 4 + \cos\theta 4 + K5 - K1;$$

$$E = B;$$

$$F = K4 \cos\theta 4 - \cos\theta 4 + K5 + K1;$$

$$\theta 3 = 2 \tan\left(\frac{-E - \sqrt{E^2 - 4DF}}{2D}\right);$$

$$\theta 2 = \left|2 \tan\left(\frac{-B - \sqrt{B^2 - 4AC}}{2A}\right)\right|;$$

$$\theta 1 = 180;$$

$$\theta 4 = 180 - \theta 4'; \text{ and}$$

$$\theta 5 = \theta 3 + \theta 6.$$

Alternate mirror drive techniques might include the mirror mounted on a linearly traveling carriage whose rotary motion is imposed with a cam through and by the linear motion. Another method might include a mirror mounted on a single point pivot slide whose position on this slide may be controlled by a planetary gear set which is coupled to a rack and pinion drive. One of such components would be mounted on the mirror and the other on the slide. Either of these combinations, although more complex with more moving parts, would enable the rotation and translation of the mirror in a motion similar to that provided by the four-bar linkage of the present invention.

It should be understood that the apparatus of the present invention may be used in a manner in which the light or radiation through the system may be in either direction. That is, the light or radiation may be in a direction opposite to that heretofore described. For example, the apparatus of the present invention may be used to project collimated light produced, for example, by a laser. The laser would be placed in a position similar to that for optics 18 and the light therefrom would be projected to the mirror 16, and directed therefrom dependent upon the position of the mirror.

Having described the invention, what is claimed as new and novel and for which it is desired to secure Letters Patent is:

1. In a system coupled to receive energy through an aperture and for reflecting said energy to receiving optics, apparatus for minimizing the size of said aperture while maintaining a relatively wide field of view of said energy, said apparatus comprising:
   A. a base, said base including fixed first and second pivot points;
   B. a mirror;
   C. means for mounting said mirror, said means for mounting including third and fourth pivot points;
   D. a first link coupled between said first and third pivot points;
   E. a second link coupled between said second and fourth pivot points;
   F. said first, second, third and fourth pivot points arranged so that said mirror may be pivoted about displaced and substantially parallel axes; and
   G. means, coupled to either said first link or said second link, for enabling the simultaneous rotation and translation of said mirror in an arc with a nonconstant radius so that the total movement of said mirror provides a total field of view of said energy which is wide relative to the size of said aperture.

2. Apparatus as in claim 1 wherein said means for enabling includes a motor coupled to one of said pivot points.

3. Apparatus as in claim 2 wherein said motor is a stepping motor and wherein said one of said pivot points is either said first pivot point or said second pivot point depending upon which one of said links said means for enabling is coupled to.

4. Apparatus as in claim 1 further comprising means for sensing the movement of said mirror.

5. Apparatus as in claim 4 wherein said means for enabling includes a motor having a shaft, and further comprising means for coupling said means for sensing to said shaft of said motor.

6. Apparatus as in claim 5 wherein said means for sensing is a potentiometer.

7. Apparatus as in claim 6 further comprising a gear mechanism coupled between said shaft of said motor and said potentiometer, said gear mechanism including a worm gear for coupling said shaft and said potentiometer and a rotary gear coupled to be driven by said worm gear and coupled to provide movement to one of said links through either said first or second pivot points.

8. Apparatus as in claim 1 further comprising:
   A. a third link;
   B. a fourth link; and
   C. said third and fourth links located in a relative position similar to said first and second links respectively, and coupled with said base of said mirror mount for movement similar to said first and second links respectively, said third and fourth links and the coupling thereof enabling more rigid support of said mirror mount and said mirror.

9. Apparatus as in claim 8 wherein said first and second links are located near either the top or bottom side of said mirror and wherein said third and fourth links are located on the side of said mirror opposite said first and second links.

10. Apparatus as in claim 1 wherein said simultaneous rotation and translation of said mirror between a first position and a second position of said mirror is enabled through said means for enabling and through four links of unequal length, said four links including said first and second links, that portion of said base between said first and second points, and that portion of said mirror between said third and fourth points.

11. Apparatus as in claim 1 wherein each of said points include a shaft to which at least one of said links is rotatably mounted.

12. Apparatus as in claim 1 wherein said energy received through said aperture is collimated energy.

13. In a system coupled to project energy, apparatus for minimizing the space required by said system, said apparatus comprising:
   A. a base, said base including fixed first and second pivot points;
   B. a mirror;
   C. means for mounting said mirror, said means for mounting including third and fourth pivot points;
   D. a first link coupled between said first and third pivot points;
   E. a second link coupled between said second and fourth pivot points;
   F. each of said pivot points having a pivot axis, each of which said pivot axis is displaced from and substantially parallel to the others; and
   G. means, coupled to either said first link or said second link, for enabling simultaneous rotation and translation of said mirror in an arc with a nonconstant radius.

14. Apparatus as in claim 13 further comprising:
   A. a third link;
   B. a fourth link; and
   C. said third and fourth links located in a relative position similar to said first and second links respectively, and coupled with said base of said mirror mount for movement similar to said first and second links respectively, said third and fourth links and the coupling thereof enabling more rigid support of said mirror mount and said mirror.

15. Apparatus as in claim 14 wherein said first and second links are located near either the top or bottom side of said mirror and wherein said third and fourth links are located on the side of said mirror opposite said first and second links.

16. Apparatus as in claim 13 wherein said simultaneous rotation and translation of said mirror between a first position and a second position of said mirror is enabled through said means for enabling and through four links of unequal length, said four links including said first and second links, that portion of said base between said first and second points, and that portion of said mirror between said third and fourth points.

* * * * *